C. F. SPAULDING.
Milk Pan.
No. 32,903.
Patented July 23, 1861.
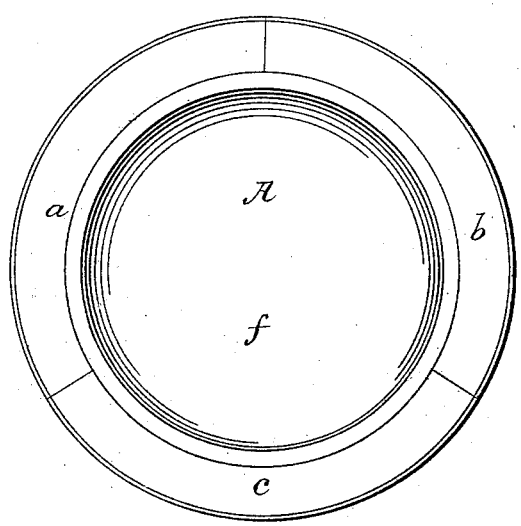
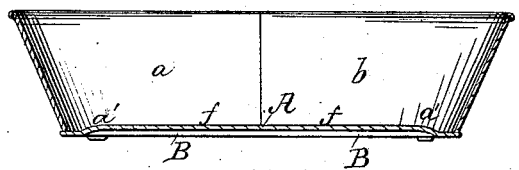
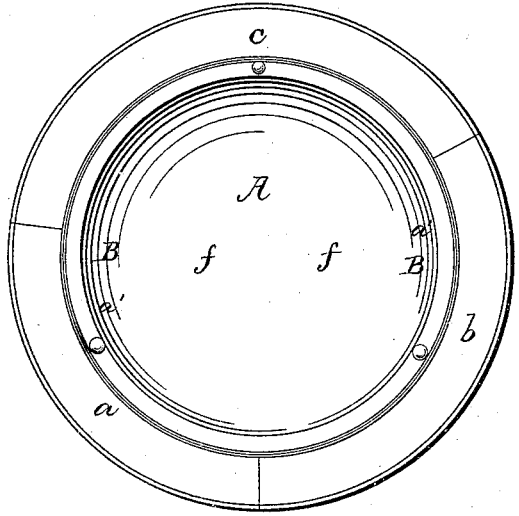
Witnesses.
Wm H Reynolds
Thomas Spooner
Inventor.
Charles F. Spaulding

UNITED STATES PATENT OFFICE.

CHARLES F. SPAULDING, OF ST. JOHNSBURY, VERMONT.

MILK-PAN.

Specification of Letters Patent No. 32,903, dated July 23, 1861.

*To all whom it may concern:*

Be it known that I, CHARLES F. SPAULDING, of St. Johnsbury, in the county of Caledonia and State of Vermont, have invented an Improved Milk-Pan; and I do hereby declare the same to be fully described in the following specification and represented in the accompanying drawings, of which—

Figure 1, is a top view of my improved milk pan, Fig. 2, is a vertical section of it, and Fig. 3, a bottom view of it.

It is a fact well known to dairy maids or those having the care of a dairy, that the ordinary tin milk pan as constructed with a plane flat bottom surface possesses two very serious defects which have led many to discard the use of tin pans in setting their milk for the purpose of obtaining the cream therefrom. The first of these defects is that without the greatest care a person in moving a common tin pan filled with milk, from one place to another, is liable to lose the contents of the pan or a great portion thereof owing to the spring and rebound of the flat bottom which continually changes the center of gravity of the mass, such upward and downward springing of the bottom especially if the bottom is made of a thin plate of tin rendering it almost impossible for a person to carry a pan filled with milk even a short distance without losing a great portion of the contents thereof. Another defect of the ordinary pan is that its bottom being a flat plane surface prevents the circulation of air under it.

To remedy those evils has been the object of my invention the nature of which consists in forming an annular chamber in the bottom or lower surface of the pan whereby both of the above defects are obviated.

In carrying out my invention I form the bottom A, of a disk or circular piece of tin of any required size, and make the sides, of three or any suitable number of pieces $a$, $b$, $c$, and unite them together in the ordinary manner; the top edges of such pieces being bent around a stiff wire in a manner well known; the bottom is next united with the lower edges of the side pieces and made perfectly water tight by means of solder applied in the usual manner.

In applying the solder to the joints of the pan in this manner, experience proves that the heat of such causes the expansion of the bottom of the pan around its entire periphery thereby producing a slackness across the bottom. In order to remove such slackness I form my air chamber B, with tapering sides $a'$, $a'$, corresponding in width to the degree of slackness or expansion of the bottom. By means of a roller properly formed working around the bottom surface of the pan near its periphery I cause the middle portion $f$, of the pan to be depressed in manner as seen in Fig. 2, which while it gives a free space for the circulation of the air, takes up the surplus of expansion in forming the tapering sides of the said air chamber thus giving stiffness to the pan.

A pan constructed in the above described improved manner has been found to operate to great advantage, its peculiar construction allowing a free circulation of the air under its lower surface, gives a very much increased yield of cream.

I claim—

As an improved article of manufacture my improved pan as made with an annular depression or air chamber B, in its bottom the same being in manner and for the purpose set forth.

CHARLES F. SPAULDING.

Witnesses:
WM. W. REYNOLDS,
THOMAS SPOONER.